United States Patent
Chen et al.

(10) Patent No.: US 9,563,655 B2
(45) Date of Patent: Feb. 7, 2017

(54) ZERO AND NEAR-ZERO DATA LOSS DATABASE BACKUP AND RECOVERY

(71) Applicant: Oracle International Corporation, Redwood Shores, CA (US)

(72) Inventors: Jin-Jwei Chen, Nashua, NH (US); Benedicto Elmo Garin, Jr., Hollis, NH (US); Mahesh Baburao Girkar, Cupertino, CA (US); Raymond Guzman, Amherst, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 158 days.

(21) Appl. No.: 13/791,517

(22) Filed: Mar. 8, 2013

(65) Prior Publication Data

US 2014/0258241 A1    Sep. 11, 2014

(51) Int. Cl.
G06F 17/30    (2006.01)

(52) U.S. Cl.
CPC ... G06F 17/30371 (2013.01); G06F 17/30368 (2013.01); G06F 17/30575 (2013.01)

(58) Field of Classification Search
CPC .............. G06F 11/1471; G06F 11/1446; G06F 11/1469; G06F 11/2064; G06F 11/2025; G06F 2201/84; G06F 17/30368; G06F 17/30088; G06F 17/30575; G06F 17/30289
USPC .................................. 707/610–633, 661–686
See application file for complete search history.

(56) References Cited

U.S. PATENT DOCUMENTS

| | | | |
|---|---|---|---|
| 5,455,946 | A | 10/1995 | Mohan et al. |
| 5,640,561 | A | 6/1997 | Satoh et al. |
| 6,199,074 | B1 | 3/2001 | Kern et al. |
| 6,289,357 | B1 | 9/2001 | Parker |
| 6,658,589 | B1 | 12/2003 | Taylor |

(Continued)

FOREIGN PATENT DOCUMENTS

| | | |
|---|---|---|
| EP | 1 407 359 B1 | 9/2009 |
| JP | 7160563 A | 6/1995 |
| KR | 100891036 B1 | 3/2009 |

OTHER PUBLICATIONS

Oracle, "Redo Transport Services", Oracle Data Guard Concepts and Administration,11g Release 1 (11.1), 1999, 8 pages url: http://docs.oracle.com/cd/B28359_01/server.111/b28294/log_transport.htm.

(Continued)

*Primary Examiner* — Michelle Owyang
(74) *Attorney, Agent, or Firm* — Vista IP Law Group, LLP

(57) ABSTRACT

A method, system and computer program product for low loss database backup and recovery. The method commences by transmitting, by a first server to a third server, a copy of a database snapshot backup, the transmitting commencing at a first time. Then capturing, by the first server, a stream of database redo data, the capturing commencing before or upon transmitting the database snapshot backup, and continuing until a third time. The stream of database redo data is received by an intermediate server after which the intermediate server transmits the stream of database redo data to the third server. Now, the third server has the database snapshot backups and the database redo data. The third server can send to a fourth server all or portion of the database redo data to be applied to the copy of the database snapshot backup restored there to create a restored database.

26 Claims, 8 Drawing Sheets

(56) References Cited

U.S. PATENT DOCUMENTS

| | | | |
|---|---|---|---|
| 6,980,988 B1* | 12/2005 | Demers et al. | |
| 7,363,549 B2 | 4/2008 | Sim-Tang | |
| 7,412,460 B2 | 8/2008 | Hrle et al. | |
| 7,464,113 B1 | 12/2008 | Girkar et al. | |
| 7,634,679 B2* | 12/2009 | Quintiliano | G06F 11/1662 714/12 |
| 7,681,074 B2* | 3/2010 | Warman et al. | 714/13 |
| 7,698,318 B2* | 4/2010 | Fries | G06F 11/1451 707/610 |
| 7,822,717 B2* | 10/2010 | Kapoor | G06F 11/1469 707/680 |
| 7,885,938 B1* | 2/2011 | Greene | G06F 11/1469 707/674 |
| 8,185,505 B1* | 5/2012 | Blitzer | G06F 11/1458 707/610 |
| 8,615,489 B2* | 12/2013 | Pershin | G06F 11/1451 703/21 |
| 8,635,187 B2* | 1/2014 | Beatty | G06F 11/1451 707/646 |
| 8,874,508 B1* | 10/2014 | Mittal | G06F 17/00 707/610 |
| 2003/0220935 A1* | 11/2003 | Vivian et al. | 707/102 |
| 2005/0050115 A1* | 3/2005 | Kekre | 707/204 |
| 2007/0061383 A1* | 3/2007 | Ozawa et al. | 707/202 |
| 2007/0168692 A1* | 7/2007 | Quintiliano | G06F 11/1662 714/4.1 |
| 2009/0307286 A1* | 12/2009 | Laffin | G06F 11/1451 |
| 2011/0161295 A1* | 6/2011 | Ngo | G06F 17/30551 707/639 |
| 2014/0068584 A1 | 3/2014 | Lim et al. | |

OTHER PUBLICATIONS

Oracle, "5 Data Guard Protection Modes", Oracle Data Guard Concepts and Administration, 11g Release 1 (11.1), 1999, 4 pages url: http://docs.oracle.com/cd/B28359_01/server.111/b28294/protection.htm#CHDEDGIF.

Ann L. Chervenak et al., "Protecting File Systems: A Survey of Backup Techniques", 1998, 15 pages.

"What Needs Backing Up?", SAP Documentation, Sep. 26, 2012, 2 pages url: http://help.sap.com/saphelp_nwpi71/helpdata/en/47/0932d3cc995bebe10000000a1553f7/content.htm.

* cited by examiner

ZERO AND NEAR-ZERO DATA LOSS DATABASE BACKUP AND RECOVERY

RELATED APPLICATIONS

Certain aspects in some embodiments of the present application are related to material disclosed in U.S. patent application Ser. No. 13/600,786, entitled "DATABASE SOFTWARE UPGRADE USING SPECIFY-VALIDATE-EXECUTE PROTOCOL" filed on Aug. 31, 2012, the content of which is incorporated by reference in its entirety in this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database systems and more particularly to techniques for continuous streaming of database redo data for zero or near-zero loss database backup and recovery.

BACKGROUND

Modern enterprise database systems store massive amounts of business data, often including mission-critical business data that needs to be backed-up. In most modern enterprise database systems, the computing infrastructure is physically distributed, sometimes over a wide geographical separation. In legacy backup scenarios, a production environment is backed up by periodically taking an interval-spaced series of snapshots of the production system, and replicating them to a geographically remote location for restoration in the event of a failure. Often, a restore operation using such a legacy backup scenario would require a suspension of at least some database services (e.g., services that write data to the production database), thus causing a period of at least partial 'down time'.

One technique to reduce the period of down time is to maintain a separate copy of the production database (e.g., one or more interval-spaced snapshots), and capture changes continuously (e.g., in a stream of redo-log changes) to be applied to the separate copy. This can potentially reduce the duration of the aforementioned down time and loss of data, however when the separate copy is stored at a remote site (e.g., a distant location relative to the production database), there can potentially be a large number of transactions in-flight between the time that a primary database transaction is performed and the time that the corresponding redo log change for the transaction is captured at the remote site. This leads to a potentially large data loss in the event of a failure.

The aforementioned legacy techniques, singly or in combination, are still deficient at least in the sense that the restored/patched database can be only as up-to-date as of the last operation captured in the last redo log file. While this legacy technique has the potential for completely restoring a destination system to a recent state, the potential is only a possibility that is dependent on the state/recency of the database to be to be patched with the redo log entries, and is further dependent on the recency of the transmission of all of the redo log entries.

One approach to address these deficiencies is to capture redo log events synchronously; that is, to force the production database to wait after a transaction until the redo log has been captured at the remote site. This introduces yet another deficiency inasmuch as the latency in communication between the production database and the remote site can be substantial, thus impacting throughput in the production system. To address this deficiency then, an intermediate server (e.g., a server located relatively nearer to the production database) can be introduced, and the synchronous redo log can be captured continuously at the intermediate server without introducing undue latency delay. The synchronously captured redo log can be applied at the remote site to an appropriately recent snapshot backup, and thus, even in the event of a failure of the primary database system, the intermediate server holds the last synchronously-captured transaction.

Individually, none of the aforementioned technologies have the desired capabilities for zero or near-zero data loss database backup and recovery. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for continuous streaming of database redo data for zero or near-zero loss database backup and recovery.

A method, system and computer program product for low loss database backup and recovery. The method commences by transmitting, by a database server to a recovery server, a copy of a database snapshot backup, the transmitting commencing at a first time. Then capturing, by the database server, a stream of database redo data, the capturing commencing before or upon start of transmitting the database snapshot backup, and continuing until a third time. The stream of database redo data is received by a nearline or otherwise low-latency intermediate server after which the intermediate server transmits the stream of database redo data to the recovery server. Now, the recovery server has the database snapshot backups and the stream database redo data, whereupon the recovery server proceeds to send both a database backup and database redo data to the original database server or yet another server and apply all or portion of the stream database redo data to the copy of the database snapshot backup to create a restored database on the original database server or on still another server.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
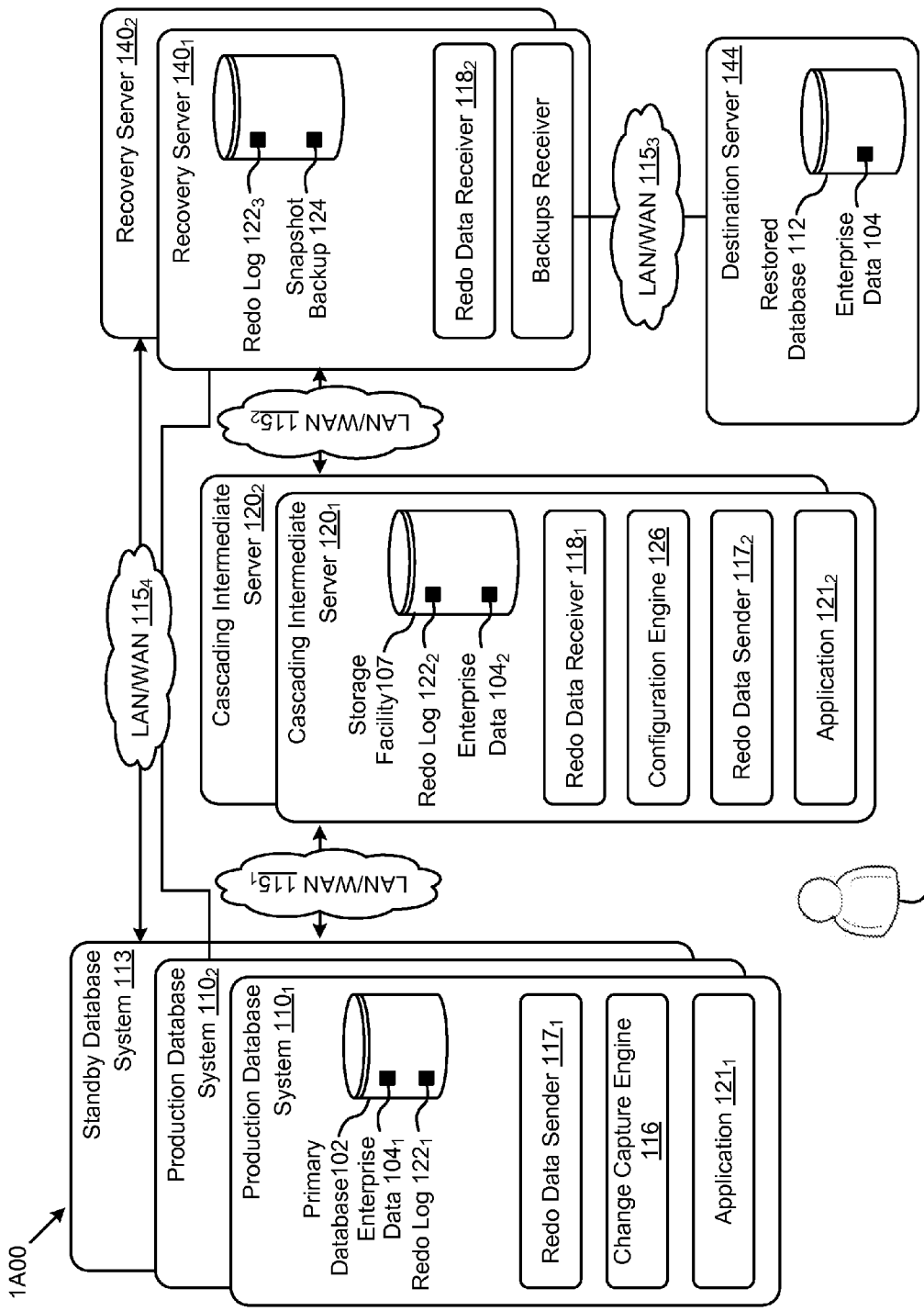
FIG. 1A is a block diagram of an environment suited for implementing continuous streaming of database redo data for zero or near-zero loss database backup and recovery, according to some embodiments.

Some embodiments of the present disclosure are directed to an improved approach for implementing continuous streaming of database redo data for zero or near-zero loss database backup and recovery. More particularly, disclosed herein and in the accompanying figures are exemplary environments, methods, and systems for implementing continuous streaming of database redo data for zero or near-zero loss database backup and recovery.

Overview

The techniques disclosed herein address disaster and/or non-disaster recovery for a database by combining periodic backups (e.g., either full backups and/or incremental backups) with a continuous stream of database redo data that are collected in real-time as they are generated. The continuous stream of database redo data is formed from a sequence of database update operations as are performed in the production database system (e.g., by an application or by an operator). In one exemplary technique, database redo data is continuously transmitted to a remote location, where the continuous sequence of database redo data is persistently stored. In exemplary embodiments, the database redo data is received in real-time and stored continuously in a stream into successive redo log files at the remote site. These redo log files, together with the periodic backups, are subsequently used in a restore and recover operation. For example, whereas some database backup systems perform backup operations using redo logs that were created at the time that a database backup copy is made, the technique introduced in FIG. 1A supports restoration and recovery from redo log streams that arise in timeframes after the time that a database backup copy is made, and up to the point in time of a failure (see FIG. 1B). As can now be understood, fine-grained and continuous replication of database redo data to a separate server supports zero data loss in the case that database redo data are transmitted synchronously with database commit operations. As such, awaiting to commit until receipt of acknowledgement that the redo data has been correctly received guarantees to bring the restored database up to the state of the last committed operation.

Certain applicable protocols (e.g., see FIG. 1B) that support sending a continuous sequence of database redo data for persistent storage at a remote location have the potential to introduce time latency between the time of issuance of a database operation and the time that the corresponding operation can be committed. Accordingly, in order to manage performance (e.g., to reduce the time between issuance of a database operation and the time that the operation can be committed) the time window between a database commit operation and successful transmission and receipt of the corresponding database redo data can be made short by employing an intermediate system that is co-located or otherwise able to communicate with low network latency (e.g., nearline) with the production database system. The use of an intermediate system that is co-located or otherwise able to carry out low latency communication protocols with the production database system facilitates high-performance streaming, even when the database backup copy and the duplicate copy of persistently held redo streams are held in a geographically distant or otherwise latency-wise distant location.

As can be understood, the techniques disclosed herein protect the production database system in disaster events such as the production database system may be completely lost as well as non-disaster events such as part of the production database system is lost or malfunctions or all or part of the database becomes un-usable due to human errors, because the state of the production database system up to the time of failure or error is completely captured and replicated to a separate system at a remote location from which the state of the production database system at the time of the failure or error event can be restored and recovered using a combination of periodic backups and the redo data replicated at real-time. The real-time redo data captures the state of the production database from (and including) the time of the last periodic backup up to the time of the failure or error. The techniques disclosed herein protect single or multiple production database systems simultaneously using a single recovery server that receives and persistently stores the periodic backups and replicated redo data from all of the production database systems at the same time (see FIG. 1A).

DEFINITIONS

Some of the terms used in this description are defined below for easy reference. The presented terms and their respective definitions are not rigidly restricted to these definitions—a term may be further defined by the term's use within this disclosure.

The term "storage facility" refers to any one or more of a range of computer data storage techniques. Strictly as examples, a storage facility can be implemented by one or more hard drives, possibly including a RAID system, and possibly including a networked storage protocols (e.g., fibre channel, FCIP, iFCP, iSCSI, etc.). A storage facility can be implemented using magnetic media or semiconductor memory.

The term "nearline" refers to low-latency communication over a network.

The term "logic" means any combination of software or hardware that is used to implement all or part of the embodiments of the present disclosure.

A "module" includes any mix of any portions of computer memory (with or without program instructions) and any extent of circuitry including hardwired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A is a block diagram of an environment 1A00 suited for implementing continuous streaming of database redo data for zero or near-zero loss database backup and recovery. As an option, the present environment 1A00 may be implemented in the context of the architecture and functionality of the embodiments described herein. Also, the environment 1A00 or any aspect therein may be implemented in any desired environment.

As shown, the environment supports backup of one or more databases (e.g., primary database 102) to a remote location where a recovery server 140 is hosted. Also shown is a destination server 144 to which server the backed-up database can be restored. The shown embodiment employs an intermediate server that is logically situated in between the production database system 110 and a recovery server 140. The networks (e.g., LAN/WAN $115_1$, LAN/WAN $115_2$, LAN/WAN $115_3$, LAN/WAN $115_4$, etc.) can comprise separate infrastructure (as shown), or can share some portions of, or all portions of the same infrastructure.

At various periodic intervals, a scheduled backup, either a full or incremental backup of the production database is taken. A backup image of the database snapshot is transmitted from the production database system 110 to the recovery server 140. The database snapshot backup 124 is persistently stored in the local storage facility of the recovery server 140.

Figure 1B:
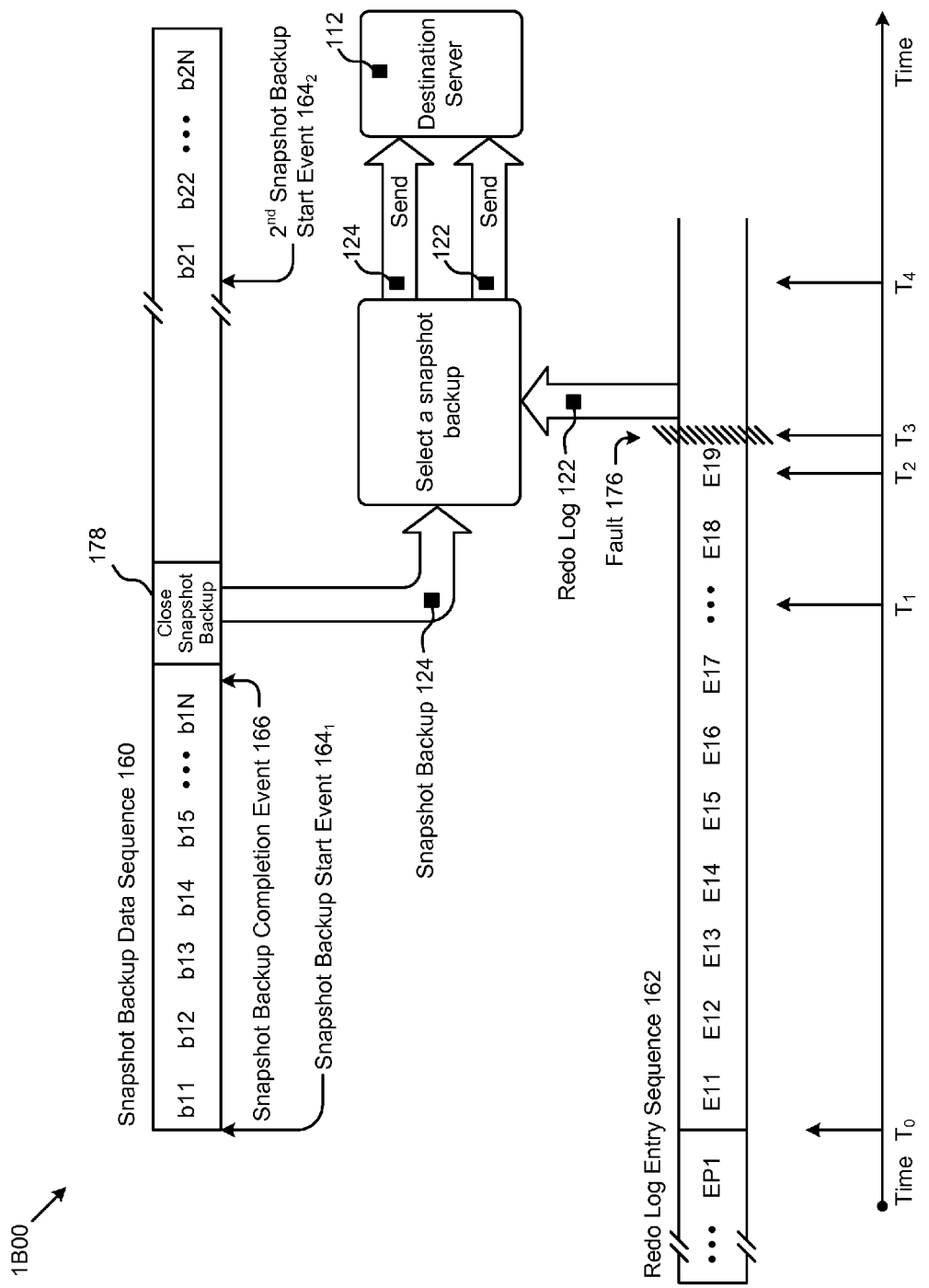
FIG. 1B is a block diagram of a data flow for implementing continuous streaming of database redo data for zero or near-zero loss database backup and recovery, according to some embodiments.

In operation, a user 105 or a software application $121_1$ accesses the primary database 102 to effect a change to the production database (e.g., to make an update to enterprise data $104_1$). The production database system comprises a change capture engine 116 that serves to capture operations as they are sent from a user 105 or from a software application $121_1$ to be applied to the production database. The change capture engine codifies an operation into a form suited for an entry into a stream of redo data (see an example of such a stream in the continuous streaming of database redo data as shown in FIG. 1B). The redo data entries are stored persistently in redo log files in a local storage facility on the production database system 110. In addition, they are also transmitted in real-time by a redo data sender $117_1$ over the network to an intermediate server 120 and/or the recovery server 140 for replication.

The intermediate server 120 together with its storage facility 107 might serve as a standby for the production database system or not. In the case where it does, the intermediate server 120 will have a copy of the enterprise's database data $104_2$ when the system is created. The intermediate server might not have a copy of the enterprise's database data $104_2$ if it does not serve as a standby database. In either case, the intermediate server 120 always has in its local persistent storage facility all of the redo data received from the production database system 110, sent by redo data sender $117_1$ and received by redo data receiver $118_1$. This redo data is also transmitted from the intermediate server 120 by redo data sender $117_2$ to the recovery server 140, received by the redo data receiver $118_2$ in the recovery server and persistently stored in the local storage facility in the recovery server 140. In some deployments, both of the periodic database backups and the streamed redo data may be transmitted from the production database system 110 directly to the recovery server 140 without going through the intermediate server 120. The intermediate server 120 can be configured (e.g., see configuration engine 126) to enable or disable one or more of certain instances of application $121_2$. For example, one or more of certain instances of application $121_2$ might be enabled so as to run read-only operations (e.g., report generation). As is known in the art, co-located network nodes are more likely to facilitate low-latency communications than are network nodes that are geographically distant.

In some situations, a recovery server may be geographically distant from the other servers. Inasmuch as a recovery server can host a local copy of a database snapshot backup 124, as well as an instance of the redo log $122_3$, it is possible that a restored database can be constructed using the recovery server. First, the database snapshot backup is restored to the destination server 144. Then the redo log data is read from the recovery server 140 and sent over the network to the destination server 144 where it is applied to the restored database. In some cases, the production database system 110 serves as the destination server (e.g., in the case that the production database system is not permanently de-commissioned) and the database snapshot backup is restored to the production database system and the redo data is also applied to the restored database backup there in the production database system to recover the production database system to the state at the time of failure.

This restore and recovery process is illustrated in FIG. 1B. In particular, the discussion of FIG. 1B includes disclosure of techniques to apply redo log entries to a database snapshot backup in order to produce a restored database 112 with zero or near-zero data loss.

Referring again to a production database system (e.g., production database system $110_1$, production database system $110_2$), some embodiments implement a high-availability configuration involving a production database system in conjunction with one or more standby database systems 113, which may provide services for other applications including read-only applications.

FIG. 1B is a block diagram of a data flow 1B00 for implementing continuous streaming of database redo data for zero or near-zero loss database backup and recovery. As an option, the present data flow 1B00 may be implemented in the context of the architecture and functionality of the embodiments described herein. Also, the data flow 1B00 or any aspect therein may be implemented in any desired environment.

As shown, data flow 1B00 depicts two distinct flows of data, namely a database snapshot backup data sequence 160 and a redo log entry sequence 162. The snapshot backup data sequence is shown as comprising a sequence of blocks (e.g., block b11, block b12, block b13, etc.), which sequence can be combined to form a snapshot backup (e.g., snapshot backup 124). For example, at some point in time (e.g., snapshot backup start event 164$_0$, a snapshot backup creation operation may be initiated, and when the earlier initiated backup completes (see snapshot backup completion event 166) the snapshot backup file may be closed (see file close event 178). As shown, the resulting snapshot backup 124 comprises all of the data found in the backed-up database as of the time of snapshot backup start event 164$_1$ (e.g., time=T$_0$). Additional snapshot backup start events (e.g., snapshot backup start event 164$_2$) might occur at later points in time (e.g., at time=T$_4$), as shown. A later-initiated snapshot backup data sequence is shown as comprising a sequence of blocks (e.g., block b21, block b22, block b23, etc.), which sequence can be combined to form a later-initiated snapshot backup file.

Now, as discussed supra, the technique of taking interval-spaced snapshot backups serves to capture the state of the backed-up database as of the point in time corresponding to the interval. However, even after a snapshot backup start event 164$_1$, and even after a snapshot backup completion event 166, changes can be made to the database to be backed-up (e.g., to primary database 102), and such changes can be captured using one or more techniques for continuous streaming of database redo data. For example, redo entries (e.g., entry E11, entry E12, entry E13, etc.) can be formed from operations performed on the primary database, and a continuous stream of such operations can be sequenced into a redo log entry sequence 162 (as shown). A continuous stream of such operations can be captured beginning at any point in time (e.g., from time=T$_0$ or earlier) and continuously into the future.

In the case that the infrastructure corresponding to the production database system 110 or its components suffers a fault 176, it is possible that the data (e.g., enterprise data 104) may be lost and may need to be restored and recovered to the production database system 110 (e.g. to primary database 102). In some disaster scenarios, the computing infrastructure corresponding to the production database system 110 or its components may suffer an event causing a complete and irreversible loss of the computing infrastructure. In such a case, the destination server 144 of FIG. 1A may be deployed to host a newly configured (and restored) instance of a production database system 110. Other fault situations can result in loss of data without loss of computing infrastructure, and in such cases, the destination server 144 of FIG. 1A may be the same production database system 110 as suffered the fault, and can be restored using the techniques herein.

Now, for implementing zero or near-zero loss database backup and recovery, an appropriate database snapshot backup is selected and sent to the destination server 144 in order to generate a restored database snapshot. Then, to perform an up-to-date restore, a redo log sequence starting at or after the corresponding backup time is selected (e.g., redo log 122) and sent to a destination server where it can be applied to the selected snapshot backup. This creates an up-to-date, restored database 112 on the destination server.

As shown, a snapshot backup completion event might occur at time T$_1$. At time T$_1$, the redo log entry sequence 162 had been continuously streamed (e.g., comprising at least entries E11 through E17) and should a fault occur at time T$_1$, the database could be restored to a state including the application of event E17. The redo log entry sequence 162 is formed by continuous streaming of database redo data, so even if a fault 176 were to occur at some point in time (e.g., time=T$_3$) that is later than the most recent snapshot backup completion event, the database can be restored to a state as of the most recently captured event, in this case event E19 (e.g. as shown at time=T$_2$). The foregoing establishes techniques to apply selected redo log entries to the snapshot backup in order to implement zero or near-zero database backup and techniques to produce a restored database 112 on a destination server with zero or near-zero data loss.

As earlier indicated, legacy database backup solutions lack the ability to perform real-time, continuous, low-latency streaming of sufficient data to perform up-to-date backup and restore operations. Some legacy database backup solutions merely perform interval-based backups (for instance, once every several hours) and thus, a failure that occurs between such interval-based backups can lead to the loss of changes that have occurred since the last successful interval-based backup. To provide improvements, an environment and data flow such as are shown in FIG. 1A and FIG. 1B respectively can achieve zero data loss, or near-zero data loss, and can be configured accordingly, for example, as given in Table 1.

TABLE 1

| Configuration | Protocol | Exemplary Infrastructure Operations |
|---|---|---|
| Zero Data Loss | Zero Data Loss Protocol (see FIG. 2) | Recovery server or nearline intermediate server handles low-latency synchronous acknowledgement of receiving streamed database redo data |
| Near-Zero Data Loss | Near-Zero Data Loss Protocol (see FIG. 2) | Recovery server or nearline intermediate server receives asynchronous streaming of database redo data |

Figure 2:
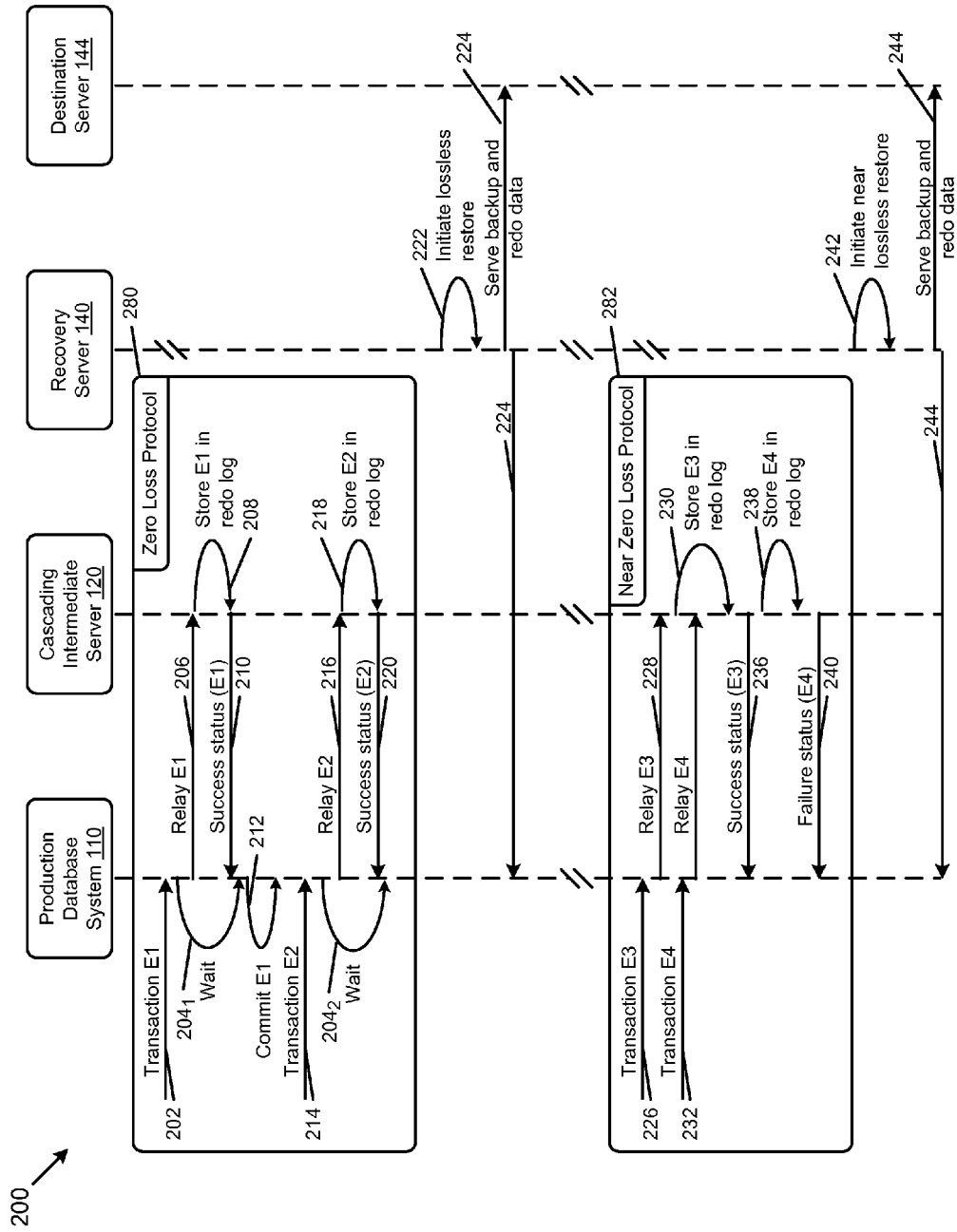
FIG. 2 is a ladder diagram showing protocols used in implementing continuous streaming of database redo data for zero or near-zero loss database backup and recovery, according to some embodiments.

In the case of zero data loss configurations, changes to the database made by database operations performed in the production system are received and acknowledged by an intermediate server and/or a recovery server—the production system waits for acknowledgement by the intermediate server and/or the recovery server that the redo data representing database changes performed in the production system had been received and persisted before actually committing the transaction (see the zero loss protocol of FIG. 2).

In the case of near-zero data loss configurations, the redo data generated by database operations performed in the production system are sent to an intermediate server, but the production database system does not wait for the acknowledgement of receipt of the redo data from the intermediate server (see the near zero loss protocol of FIG. 2).

FIG. 2 is a ladder diagram showing instances of protocols 200 used in implementing continuous streaming of database redo data for zero and near-zero data loss database backup and recovery. As an option, the present protocols 200 may be implemented in the context of the architecture and functionality of the embodiments described herein. Also, the protocols 200 or any aspect therein may be implemented in any desired environment.

Two named protocols are presented in FIG. 2, namely a zero loss protocol 280, and a near zero loss protocol 282. As depicted, the zero loss technique includes a wait before commit protocol, which wait before commit protocol serves to ensure that changes made by a particular transaction (e.g., transaction E1) have been received and successfully persisted by an intermediate server and/or a recovery server before the transaction E1 is committed at the production database system. In some embodiments, the protocol commences upon the performance of a transaction E1 (see message 202), and may have been initiated by a user or by an application. Aspects of transaction E1 are codified (e.g., as a redo log entry) and relayed (see message 206) to an intermediate server and/or a recovery server, which intermediate or recovery server in turn stores event E1 into a redo log(see operation 208), and responds back to the sender that the event had been successfully stored (see message 210). The sender (e.g., any computational element) had been waiting (see operation $204_1$), however upon receipt of the message 210, the sender can then commit the transaction (see operation 212). As shown, under the zero loss protocol, the sender waits for a success indication that the redo log entry had been replicated to another system and persisted there to ensure that once the transaction commits, it is guaranteed that the effect of the transaction can be fully recovered even if the production database system is lost afterwards. Following this protocol, each transaction observes the wait-before-commit protocol. As shown, changes made by transaction E2 (see message 214) are relayed (see message 216) to be stored in a redo log (see operation 218), which storage operation, if successful, results in a success indication (see message 220), which further results in satisfaction of the wait operation (see operation $204_2$). Transactions E1 and E2 can be executed in parallel in time (e.g. on a computer with multiple processors) or not (e.g. on a computer incapable of parallel processing).

Regarding the near zero loss protocol 282, the near zero loss technique does not include a wait-before-commit protocol. In some embodiments, the protocol commences upon the performance of a transaction E3 (see message 226), and may have been initiated by a user or by an application. Aspects of transaction E3 are codified (e.g., as a redo log entry) and relayed (see message 228) to an intermediate server, which intermediate or recovery server in turn stores event E3 into a redo log(see operation 230), and responds back to the sender that the event had been successfully stored (see message 236). As shown, under the near zero loss protocol, the sender does not wait for a success indication that the redo log entry had been saved before actually committing the transaction. Instead, the sender can immediately initiate a next transaction such as transaction E4 (e.g., see message 232). The intermediate server attempts to store event E3 and event E4 into the redo log (see operation 230 and operation 238, respectively). The store operation may be successful, resulting in a success indication (see message 236) or the store operation may be unsuccessful, resulting in a failure indication (see message 240). In addition, just as an example, due to network latency, the redo log entry of transaction E3 may successfully reach the intermediate server while that of transaction E4 may not. Should the production database system be lost after both transactions E3 and E4 committed, the restore and recover operation will be able to recover transaction E3 but not E4, thus resulting in a very small data loss.

In either case of the zero loss protocol 280, or the near zero loss protocol 282, a recovery server 140 can be directed (e.g., by a user) to initiate a restore. For example, after following the zero loss protocol 280, the recovery server 140 can be directed (e.g., by a user) to initiate a zero loss restore (see operation 222), which has the effect of the lossless restore data being served to the designated destination server (see message 224). Or, for example, after following the near zero loss protocol 282, the recovery server 140 can be directed (e.g., by a user) to initiate a near zero loss restore (see operation 242), which has the effect of the near lossless restore data being served to the designated destination server (see message 244). The designated destination server can be the same production database system that the database snapshot backups and redo data originally came from (e.g., in cases of certain recoverable faults), or the designated destination server can be a new infrastructure newly created to replace the original production database system (e.g., in cases of faults that cause irreversible loss of the original production database system infrastructure).

Cascading of Intermediate Servers

Returning to the discussion of environment 1A00, FIG. 1A shows only one intermediate server, however some embodiments may comprise any number of intermediate servers in a cascade. For example, in a global deployment, a transaction performed in Bombay, India might be streamed to a first nearline intermediate server co-located (e.g., in the same facility or in a nearby location), and then to a second (e.g., cascaded) intermediate server in Tokyo, Japan, and then to a recovery server 140 located in San Jose, Calif., which recovery server serves as a repository for any forms of a database snapshot backup 124 (as shown). The intermediate servers that are logically in-between the source production database system and the recovery system can comprise physically separated and/or geographically-distant cascaded levels.

Protecting Multiple Production Database Systems

The techniques and protocols disclosed herein apply to a single instance of recovery server 140 protecting one or more production database systems (e.g. $110_1$, $110_2$, $110_3$, etc). In the case of multiple production database systems, each production database system may use its own intermediate server. For example, the production database system $110_1$ sends its redo data to the intermediate server $120_1$ which in turn transmits the redo data to the recovery server $140_1$. The production database system $110_2$ sends its redo data to the intermediate server $120_2$ which in turn transmits the redo data to the recovery server $140_1$ and so on. In addition, any or all of the production database systems can send their own snapshot backups to the recovery server $140_1$. The recovery server $140_1$ thus has a separate set of snapshot backups and redo logs for each individual production database system that can be used to restore and recover each production database when needed.

Recovery Server Redundancy

For high availability of the recovery server, more than one recovery server may be used to protect the same set of production database systems. For example, in exemplary environments, the recovery server $140_1$ may replicate all of the snapshot backups and redo data it receives from all of the production database systems to a second recovery server $140_2$ such that in case the first recovery server $140_1$ fails the restoration and recovery of a production database can still be performed from the second recovery server $140_2$ or vice versa. Alternatively, instead of getting all of the snapshot backups and redo data from the first recovery server $140_1$, the second recovery server $140_2$ can be configured to receive snapshot backups and redo data from exactly the same sources as the first recovery server $140_1$. In this situation, all of the production database systems are configured to send their snapshot backups to all of the recovery servers at the same time. And, all of the intermediate servers can be configured to send the redo data they receive to all of the recovery servers. With two recovery servers, should one recovery server fail, restoring and recovering production database systems is still guaranteed as it can be done from another recovery server. With three recovery servers, should two recovery servers fail at the same time, restoring and recovering production database systems is still guaranteed as it can be done from the third recovery server.

Additional Embodiments of the Disclosure

Figure 3A:
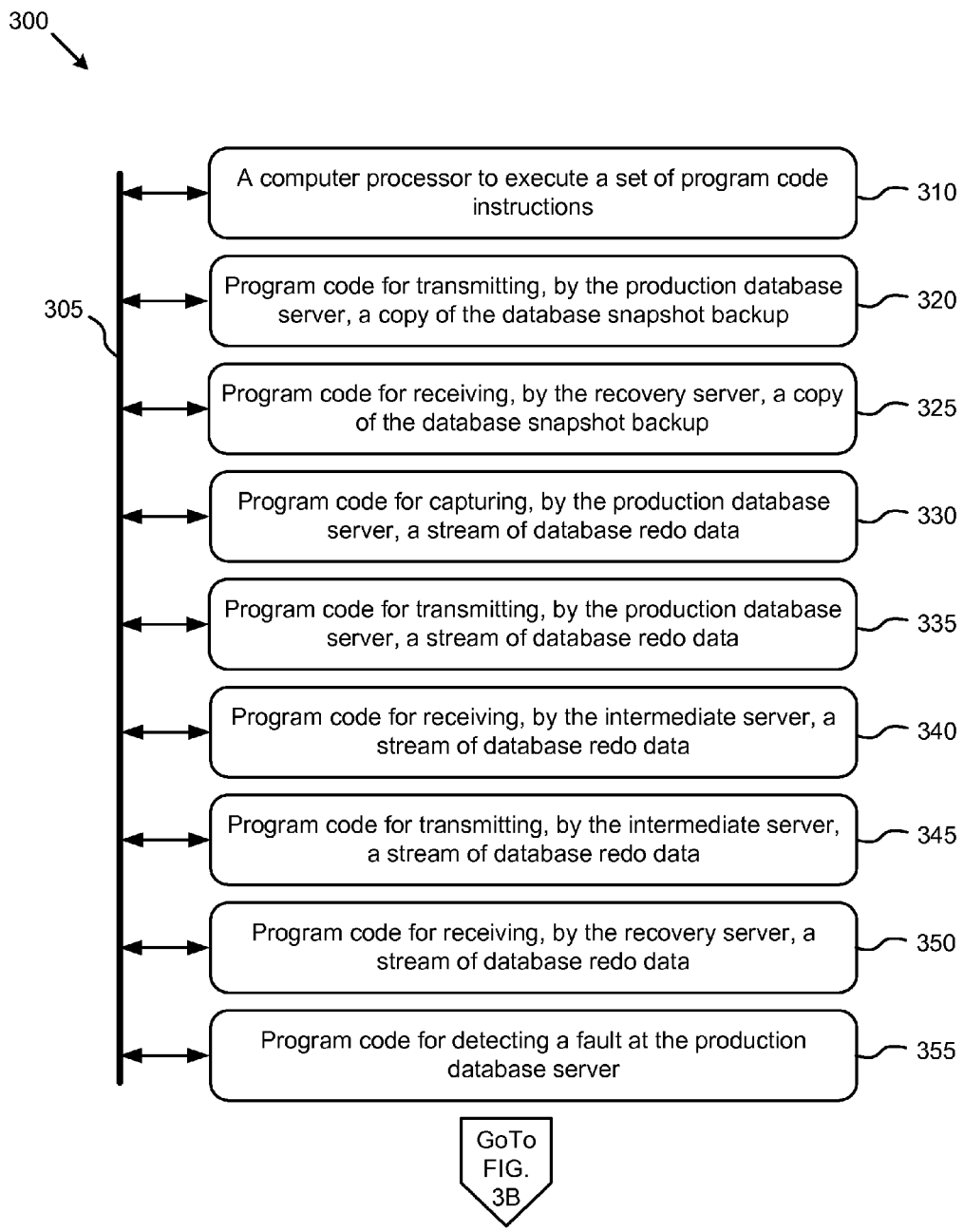
FIG. 3A and FIG. 3B present a flow chart of a system for continuous streaming of database redo data for zero or near-zero loss database backup and recovery, according to some embodiments.
Figure 3B:
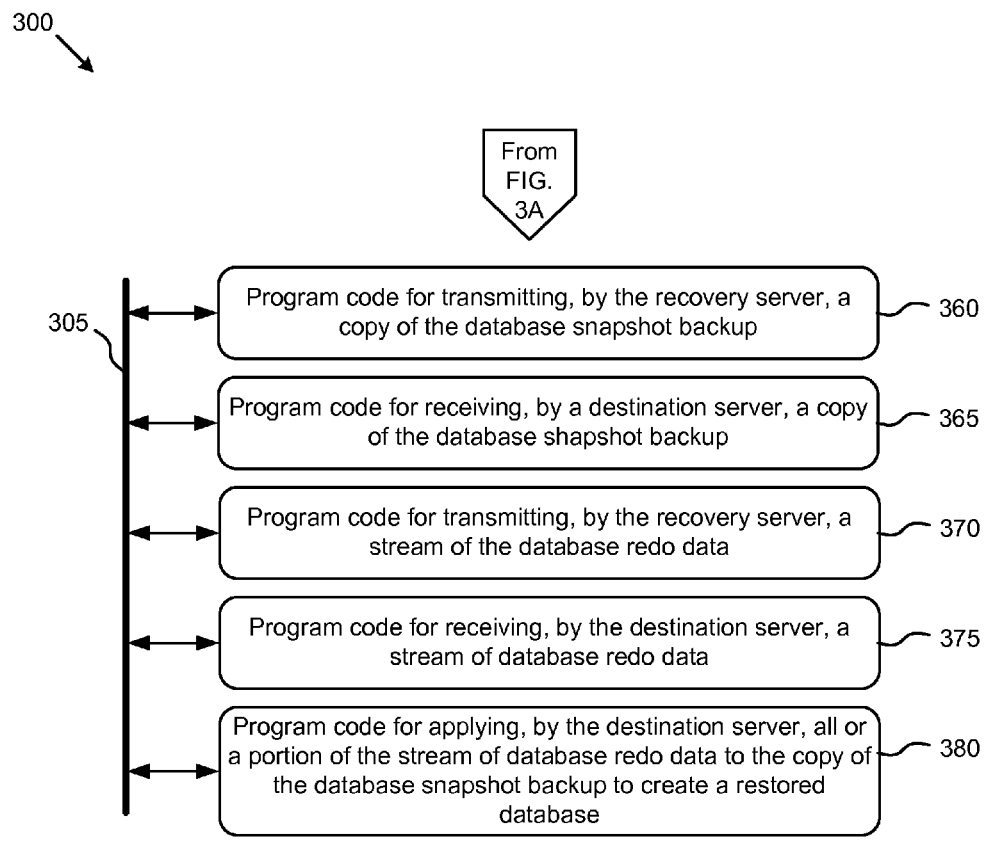

FIGS. 3A and 3B present a flow chart of a system for continuous streaming of database redo data for zero or near-zero loss database backup and recovery. As an option, the present system 300 may be implemented in the context of the architecture and functionality of the embodiments described herein. Of course, however, the system 300 or any operation therein may be carried out in any desired environment. As shown, an operation can be implemented in whole or in part using program instructions accessible by a module. The modules are connected to a communication path 305, and any operation can communicate with other operations over communication path 305. The modules of the system can, individually or in combination, perform method operations within system 300. Any operations performed within system 300 may be performed in any order unless as may be specified in the claims. The embodiment of FIGS. 3A and 3B comprises a computer processor to execute a set of program code instructions (see module 310) and modules for accessing memory to hold program code instructions to perform: transmitting, by the production database server, a copy of the database snapshot backup (see operation 320); receiving, by the recovery server, a copy of the database snapshot backup (see operation 325); capturing, by the production database server, a stream of database redo data (see operation 330); transmitting, by the production database server, a stream of database redo data (see operation 335); receiving, by the intermediate server, a stream of database redo data (see operation 340); transmitting, by the intermediate server, a stream of database redo data (see operation 345); receiving, by the recovery server, a stream of database redo data (see operation 350); detecting a fault at the production database server (see operation 355); transmitting, by the recovery server, a copy of the database snapshot backup (see operation 360); receiving, by a destination server, a copy of the database snapshot backup (see operation 365); transmitting, by the recovery server, a stream of the database redo data (see operation 370); receiving, by the destination server, a stream of database redo data (see operation 375); and applying, by the destination server, all or a portion of the stream of database redo data to the copy of the database snapshot backup to create a restored database (see operation 380).

The method of FIG. 3A and FIG. 3B may further comprise a zero loss protocol, wherein, after initiating a database transaction, the method waits for changes of the database transaction to be persistently stored at the intermediate server (as well as persistently stored locally on the production database system as implied by the notion of a transaction), and committing the database transaction only after receiving an indication that changes of the database transaction has been persistently stored at the intermediate server.

The method of FIG. 3A and FIG. 3B may further comprise initiating a database transaction, and committing the database transaction without waiting for changes of the database transaction to be stored at the intermediate server, as in the near-zero data loss protocol.

For reasons of low latency performance (and other reasons) the intermediate server may be co-located with the production database server and use high-performance LAN infrastructure. Yet, for reasons of global deployment (and other reasons), the recovery server may be more geographically distant from the production database server than is the intermediate server.

Figure 4:
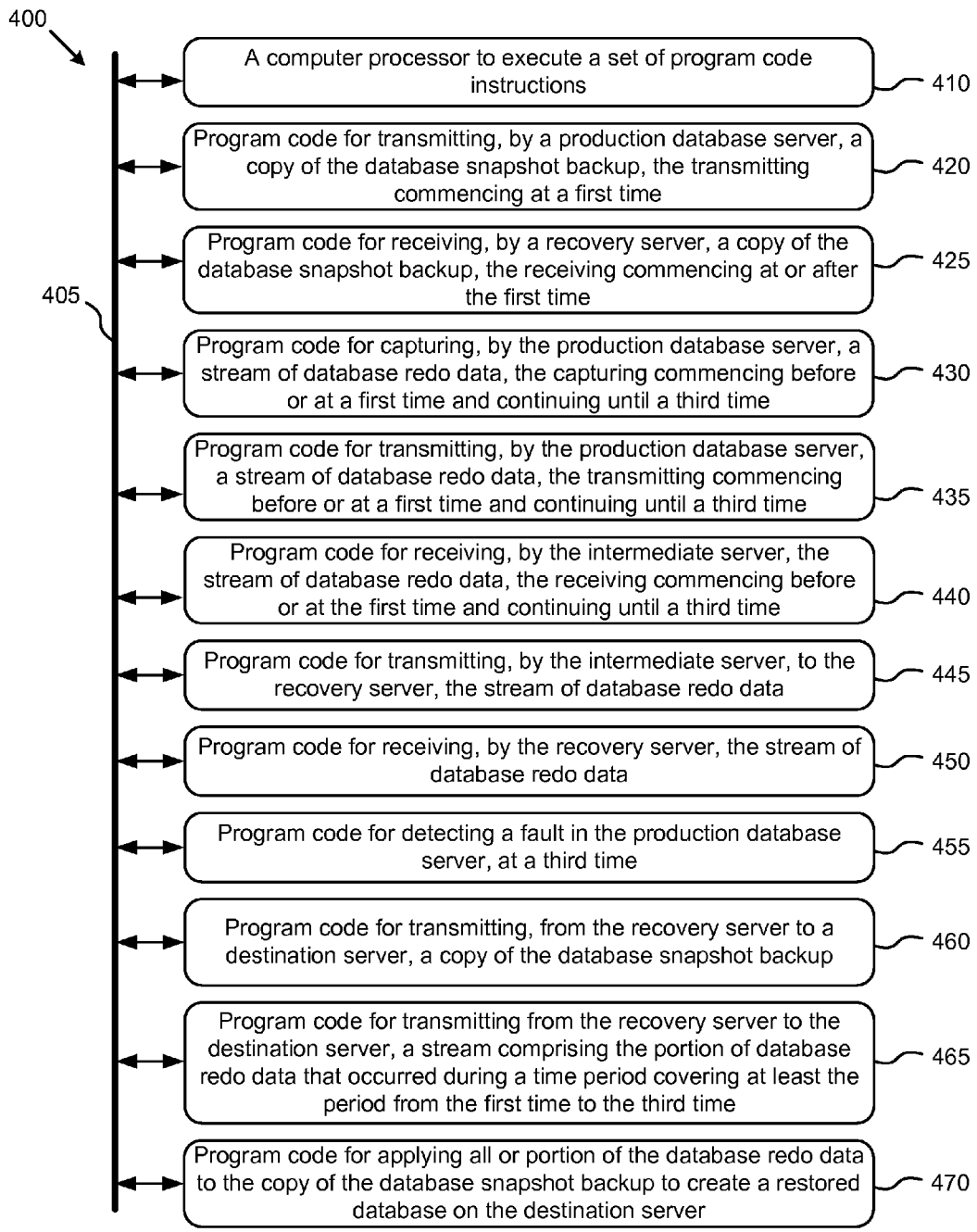
FIG. 4 is a flow chart system of a system for continuous streaming of database redo data for zero or near-zero loss database backup and recovery, according to some embodiments.

FIG. 4 depicts a block diagram of a system. Only some of the steps of FIGS. 3A and 3B are needed to practice certain of the techniques herein. As an option, the present system 400 may be implemented in the context of the architecture and functionality of the embodiments described herein or any operation or series of operations may be carried out a particular environment. As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. The system 400 recites one particular temporal performance of the operations, however any operations performed within system 400 may be performed in any order unless as may be specified in the claims. The embodiment of FIG. 4 implements a portion of a computer system, shown as system 400, comprising a computer processor to execute a set of program code instructions (see module 410) and modules for accessing memory to hold program code instructions to perform: transmitting, by a production database server, a copy of the database snapshot backup, the transmitting commencing at a first time (see module 420); receiving, by a recovery server, a copy of the database snapshot backup, the receiving commencing at or after the first time (see module 425); capturing, by the production database server, a stream of database redo data, the capturing commencing before or at a first time and continuing until a third time (see module 430); transmitting, by the production database server, a stream of database redo data, the transmitting commencing before or at a first time and continuing until a third time (see module 435); receiving, by the intermediate server, the stream of database redo data, the receiving commencing before or at the first time and continuing until a third time (see module 440); transmitting, by the intermediate server, to the recovery server, the stream of database redo data (see module 445); receiving, by the recovery server, the stream of database redo data (see module 450); detecting a fault in the production database server, at a third time (see module 455); transmitting, from the recovery server to a destination server, a copy of the database snapshot backup (see module 460); transmitting from the recovery server to the destination server, a stream comprising the portion of database redo data that occurred during a time period covering at least the period from the first time to the third time (see module 465); and applying all or portion of the database redo data to the copy of the database snapshot backup to create a restored database on the destination server (see module 470).

Some embodiments may vary certain aspects of the system and operations as described in the foregoing. Strictly as examples, the system 400 can be configured as per the following variations:

system 400, further comprising initiating a database transaction and waiting for the database transaction to be received and stored at the intermediate server or the recovery server, before committing the database transaction;

system 400, further comprising initiating a database transaction and committing the database transaction before the database transaction is received and stored at the intermediate server or the recovery server;

system 400, where the destination server for restoration and recovery is the original production database server;

system 400, where the destination server for restoration and recovery is not the original production database server;

system 400, where the intermediate server is co-located with the production database server;

system 400, where the intermediate server is not co-located with the production database server;

system 400, where the intermediate server is cascaded through another one or more intermediate servers;

system 400, where the recovery server is co-located with the production database server;

system 400, where the recovery server is not co-located with the production database server;

system 400, where the recovery server is more geographically distant from the production database server than is the intermediate server geographically distant from the production database server;

system 400, where there are two or more recovery servers holding identical or overlapping sets of database snapshot backups and redo data, protecting one another in a redundant high availability configuration;

system 400, where a single production database server or multiple, distinct production database servers are protected by a single recovery server; and system 400, where a single production database server or multiple, distinct production database servers are protected by a pair of recovery servers configured for redundancy and high availability.

Figure 5:
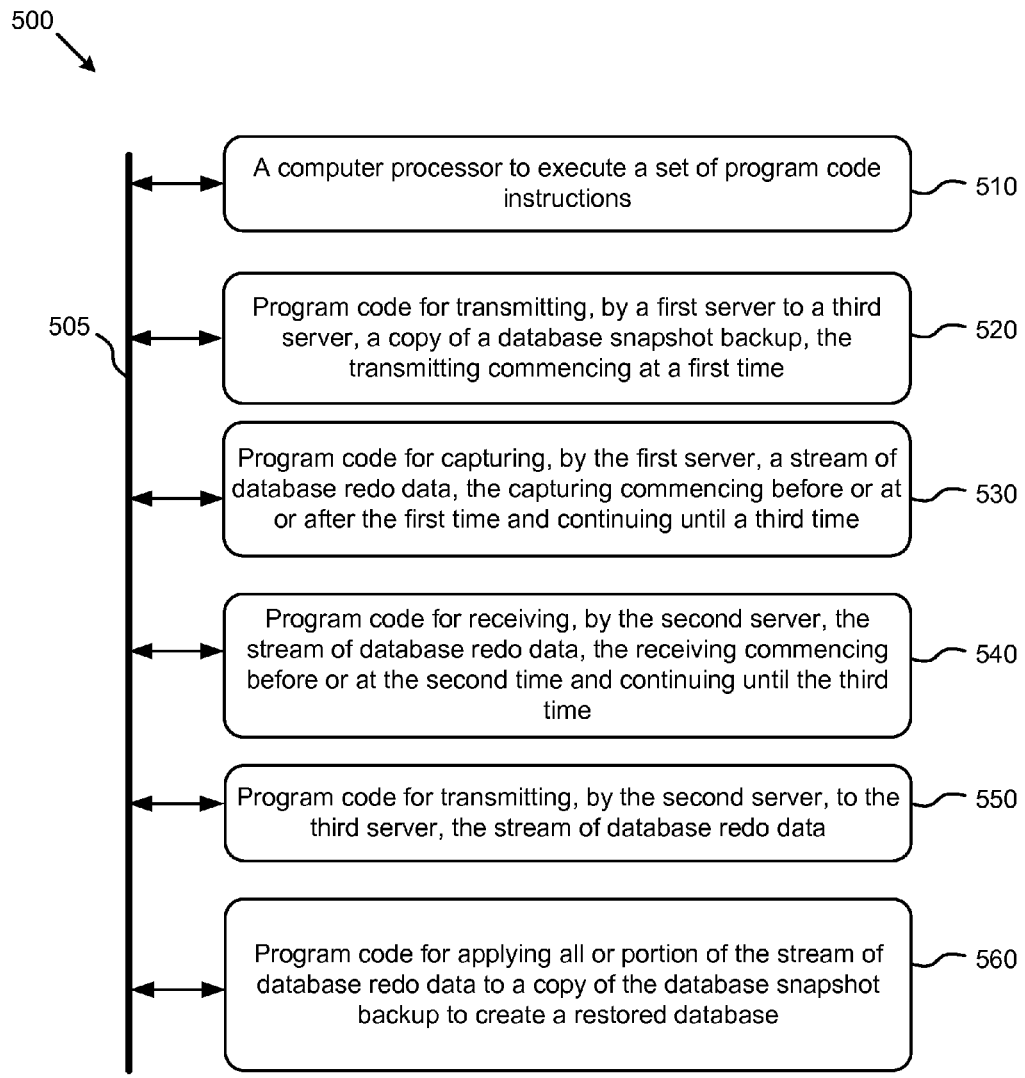
FIG. 5 is a flow chart of a system for continuous streaming of database redo data for zero or near-zero loss database backup and recovery, according to some embodiments.

FIG. 5 is a flow chart of a system for continuous streaming of database redo data for zero or near-zero loss database backup and recovery. Some of the steps of FIG. 4 are performed in the system 500. FIG. 5 implements a portion of a computer system, shown as system 500, comprising a computer processor to execute a set of program code instructions (see module 510) and modules for accessing memory to hold program code instructions to perform: transmitting, by a first server to a third server, a copy of a database snapshot backup, the transmitting commencing at a first time (see module 520); capturing, by the first server, a stream of database redo data, the capturing commencing before or at the first time and continuing until a third time (see module 530); receiving, by the second server, the stream of database redo data, the receiving commencing before or at a second time and continuing until the third time (see module 540); transmitting, by the second server, to the third server, the stream of database redo data (see module 550); and applying all or portion of the stream of database redo data to an instance of the copy of the database snapshot backup to create a restored database (see module 560).

System Architecture Overview

Figure 6:
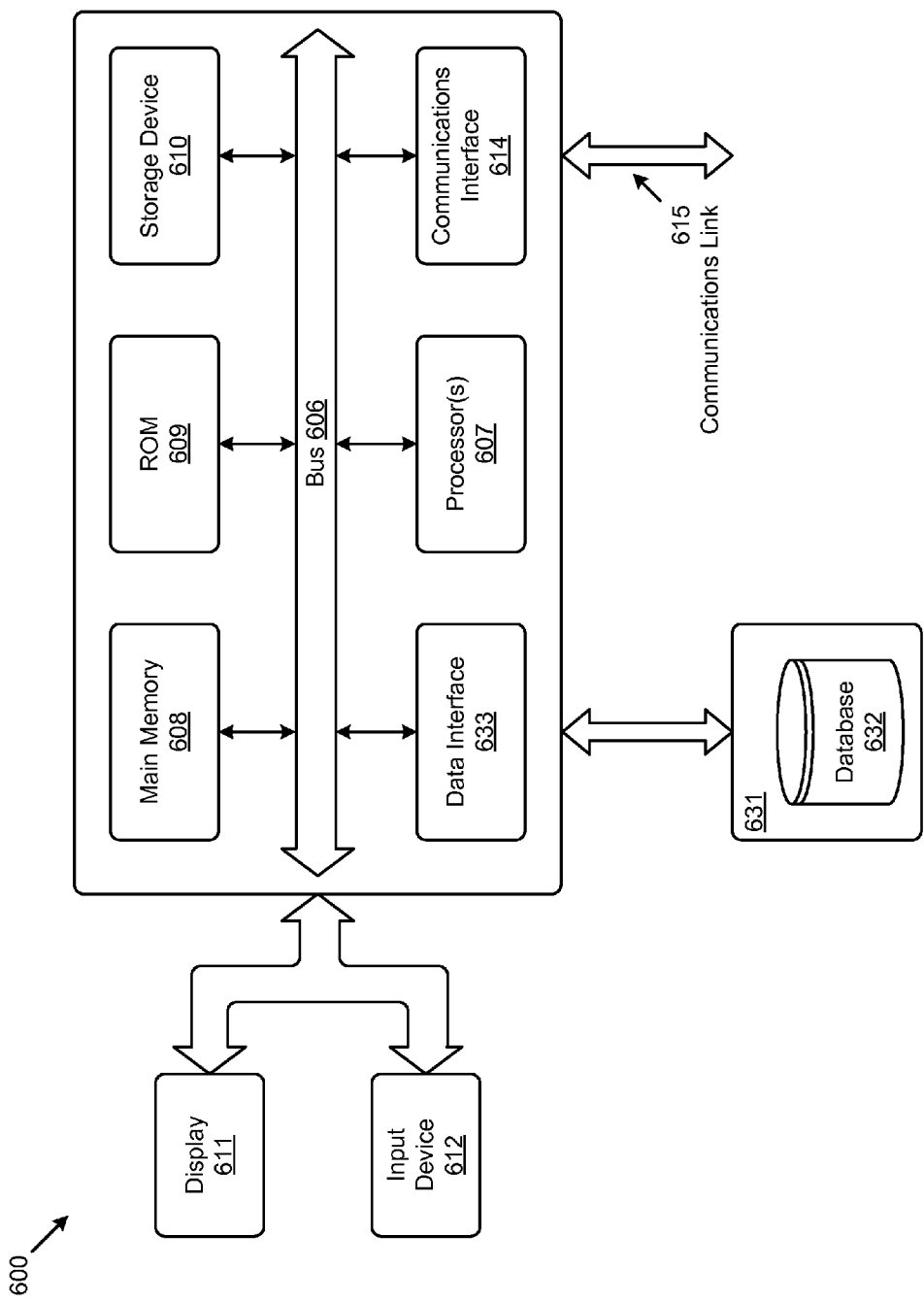
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for database backup and recovery of database transactions, the method comprising:

transmitting, from a first server to a backup server, backup copies of a database of the first server, the backup copies comprising one or more full backups and one or more incremental backups, wherein the one or more full backups are interval-spaced full images of the database at the first server and the one or more incremental backups are incremental images of the database that are provided to the backup server at various periodic intervals;

storing the backup copies in a storage facility of the backup server rather than maintaining the database of first server itself at the backup server;

transmitting database redo data from the first server to an intermediate server or the backup server prior to committing a database transaction at the first server, wherein the database redo data represent changes to the database corresponding to a database transaction at the first server, and wherein if the database redo data is transmitted to the intermediate server, the intermediate server transmits the database redo data to the backup server;

storing the transmitted database redo data in at least the intermediate server or the backup server;

receiving an acknowledgment from the intermediate server or the backup server to the first server,
  wherein the acknowledgement, if received from the intermediate server, indicates: (a) receipt of the database redo data from the first server at the intermediate server and (b) storage of the database redo data in a storage facility at the intermediate server,
  wherein the acknowledgement, if received from the backup server, indicates: (a) receipt of the database redo data from the first server at the backup server and (b) storage of the database redo data in a storage facility at the backup server;

identifying a series of redo data records from the one or more redo data stored at the backup server after receipt of the transmitted database redo data from the intermediate server or the first server at the backup server, wherein the series of redo data records capture changes to the database at the first server after specific points in time in which the one or more full backups and the one or more incremental backups capture a state of the database; and generating a restored database at a destination server different from the backup server using at least one of the backup copies of the database at the backup server along with the series of redo data records via communication with the backup server.

2. The method of claim 1, wherein the destination server is the first server.

3. The method of claim 1, wherein the series of database redo records used to generate the restored database at the destination server is sent from the backup server.

4. The method of claim 1, wherein the backup copies of the database are database snapshots.

5. The method of claim 1, wherein the backup server is more geographically distant from the first server than is the intermediate server geographically distant from the first server.

6. The method of claim 1, wherein the intermediate server is co-located with the first server.

7. The method of claim 1, wherein the backup server is not co-located with the first server.

8. The method of claim 1, further comprising the backup server replicating all of the backup copies of the database and the series of database redo records to a second backup server, wherein the second backup server can perform restoration and recovery of database transactions for the backup server if the backup server fails.

9. The method of claim 1, wherein the intermediate server communicates nearline with the first server.

10. A computer system for continuous streaming of database redo data for database backup and recovery of database transactions, comprising:
  a computer processor to execute a set of program code instructions; and
  a memory to hold the program code instructions, in which the program code instructions comprises program code to perform:
  transmitting, from a first server to a backup server, backup copies of a database of the first server, the backup copies comprising one or more full backups and one or more incremental backups, wherein the one or more full backups are interval-spaced full images of the database at the first server and the one or more incremental backups are incremental images of the database that are provided to the backup server at various periodic intervals;
  storing the backup copies in a storage facility of the backup server rather than maintaining the database of the first server itself at the backup server;
  transmitting database redo data from the first server to an intermediate server or the backup server prior to committing a database transaction at the first server, wherein the database redo data represent changes to the database corresponding to a database transaction at the first server, and wherein if the database redo data is transmitted to the intermediate server, the intermediate server transmits the database redo data to the backup server;
  storing the transmitted database redo data in at least the intermediate server or the backup server;
  receiving an acknowledgment from the intermediate server or the backup server to the first server,
    wherein the acknowledgement, if received from the intermediate server, indicates: (a) receipt of the database redo data from the first server at the intermediate server and (b) storage of the database redo data in a storage facility at the intermediate server,
    wherein the acknowledgement, if received from the backup server, indicates: (a) receipt of the database redo data from the first server at the backup server and (b) storage of the database redo data in a storage facility at the backup server;
  identifying a series of redo data records from the one or more redo data stored at the backup server after receipt of the transmitted database redo data from the intermediate server or the first server at the backup server, wherein the series of redo data records capture changes to the database at the first server after specific points in time in which the one or more full backups and the one or more incremental backups capture a state of the database; and
  generating a restored database at a destination server different from the backup server using at least one of the backup copies of the database at the backup server along with the series of redo data records via communication with the backup server.

11. The computer system of claim 10, wherein the destination server is the first server.

12. The computer system of claim 10, wherein the series of database redo records used to generate the restored database at the destination server is sent from the backup server.

13. The computer system of claim 10, wherein the backup copies of the database are database snapshots.

14. The computer system of claim 10, wherein the backup server is more geographically distant from the first server than is the intermediate server geographically distant from the first server.

15. The computer system of claim 10, wherein the intermediate server is co-located with the first server.

16. The computer system of claim 10, wherein the backup server is not co-located with the first server.

17. The computer system of claim 10, further comprising program code for the backup server replicating all of the backup copies of the database and the series of database redo records to a second backup server, wherein the second backup server can perform restoration and recovery of database transactions for the backup server if the backup server fails.

18. The computer system of claim 10, wherein the intermediate server communicates nearline with the first server.

19. A computer program product embodied in a non-transitory computer readable medium, the computer readable medium having stored thereon a sequence of instructions which, when executed by a processor causes the processor to execute a process to implement continuous streaming of database redo data for database backup and recovery of database transactions, the process comprising:
   transmitting, from a first server to a backup server, backup copies of a database of the first server, the backup copies comprising one or more full backups and one or more incremental backups, wherein the one or more full backups are interval-spaced full images of the database at the first server and the one or more incremental backups are incremental images of the database that are provided to the backup server at various periodic intervals;
   storing the backup copies in a storage facility of the backup server rather than maintaining the database of the first server itself at the backup server;
   transmitting database redo data from the first server to an intermediate server or the backup server prior to committing a database transaction at the first server, wherein the database redo data represent changes to the database corresponding to a database transaction at the first server, and wherein if the database redo data is transmitted to the intermediate server, the intermediate server transmits the database redo data to the backup server;
   storing the transmitted database redo data in at least the intermediate server or the backup server;
   receiving an acknowledgment from the intermediate server or the backup server to the first server,
      wherein the acknowledgement, if received from the intermediate server, indicates: (a) receipt of the database redo data from the first server at the intermediate server and (b) storage of the database redo data in a storage facility at the intermediate server,
      wherein the acknowledgement, if received from the backup server, indicates: (a) receipt of the database redo data from the first server at the backup server and (b) storage of the database redo data in a storage facility at the backup server;
   identifying a series of redo data records from the one or more redo data stored at the backup server after receipt of the transmitted database redo data from the intermediate server or the first server at the backup server, wherein the series of redo data records capture changes to the database at the first server after specific points in time in which the one or more full backups and the one or more incremental backups capture a state of the database; and
   generating a restored database at a destination server different from the backup server using at least one of the backup copies of the database at the backup server along with the series of redo data records via communication with the backup server.

20. The computer program product of claim 19, wherein the destination server is the first server.

21. The computer program product of claim 19, wherein the series of database redo records used to generate the restored database at the destination server is sent from the backup server.

22. The computer program product of claim 19, wherein the backup copies of the database are database snapshots.

23. The computer program product of claim 19, wherein the backup server is more geographically distant from the first server than is the intermediate server geographically distant from the first server.

24. The computer program product of claim 19, wherein the intermediate server is co-located with the first server.

25. The computer program product of claim 19, further comprising instructions for the backup server replicating all of the backup copies of the database and the series of database redo records to a second backup server, wherein the second backup server perform restoration and recovery of database transactions for the backup server if the backup server fails.

26. The computer program product of claim 19, wherein the intermediate server communicates nearline with the first server.

* * * * *